May 10, 1966 R. D. BABYLON 3,250,861

RAILROAD WAY STATION TELEPHONE AMPLIFIER

Filed April 19, 1963

INVENTOR.
Robert D. Babylon

BY

Hovey, Schmidt, Johnson & Hovey
ATTORNEYS.

United States Patent Office 3,250,861

Patented May 10, 1966

3,250,861

RAILROAD WAY STATION TELEPHONE AMPLIFIER

Robert D. Babylon, 18908 Holke Road, Independence, Mo.

Filed Apr. 19, 1963, Ser. No. 274,281

1 Claim. (Cl. 179—81)

Figure 1:
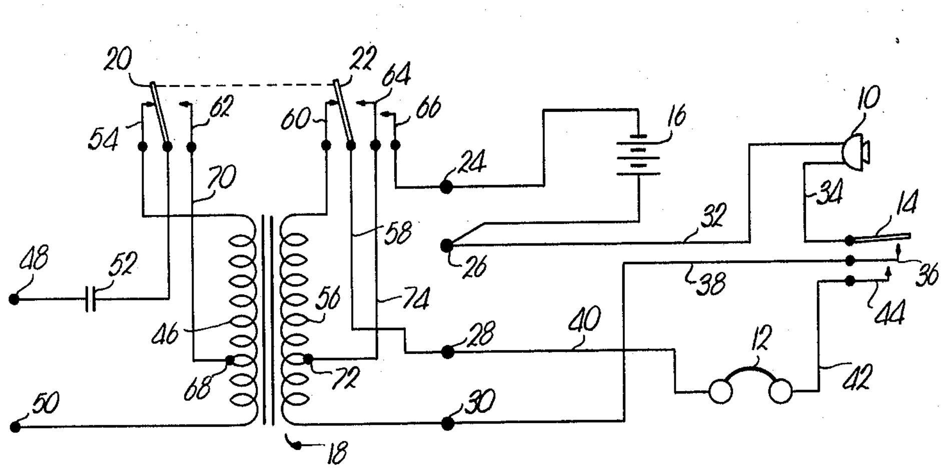

This invention relates to telephone amplifiers for railroad stations.

In existing railroad communication systems it is common to provide the larger railroad stations with telephone apparatus of advanced design for communication with way stations in smaller outlying communities. These way stations, however, are frequently only equipped with simple telephone receiving and transmitting apparatus containing no stages of amplification or other means for increasing the level of transmitted or received signals. Furthermore, way station telephone instruments are often old and out-dated and, for this reason, generally inefficient in operation.

It was originally thought by the designers of telephone equipment for railroad way stations that such equipment would be adequate for the transmission and reception of communications between the way station and the hub or central station, and also that such apparatus would enable the various way stations to communicate with one another. This would likely be the case if the impedance of telephone lines could be maintained at a constant value. Although theoretically a telephone line is a 600 ohm line, this value frequently varies over a wide range and thus lowers the signal level on the line considerably from the expected or optimum value.

The usual reference level for telephone line transmissions (zero decibels) is one milliwatt dissipation in a 600 ohm load. Using existing way station apparatus, however, this level frequently falls to —10 to —20 db due to the aforesaid factors. It is informative to note in this regard that telephone line impedance may fall as low as 150 ohms due to water on the line or unintentional grounding of the line caused by contact with brush, etc. Therefore, it may readily be appreciated that it is most difficult to maintain the signal level at zero db.

Another problem in this area is concerned with the expense of providing each way station with modernized telephone equipment and the large number of older instruments or subsets presently in use. Although presently it is often necessary for messages to be relayed due to excessive losses in signal strength on the line, this loss of time and inconvenience must be weighed against the expense of replacing every way station subset with more modern equipment. Furthermore, if, instead of replacing the existing subsets with new equipment, modification of the existing subsets is undertaken, then such modification must not involve extensive re-working of the existing subsets or the expense may aagin be excessive.

It is, therefore, an object of this invention to provide a telephone amplifier for railroad way station subsets which may be easily added to existing subsets by relatively unskilled railroad personnel.

It is another object of this invention to provide a simple and inexpensive device for raising the level of signals on telephone or other lines to the zero db level utilizing existing power sources.

It is still another object of this invention to provide an amplifier for railroad telephone lines having amplified break-in during transmission to allow the operator at the transmitting station to easily hear the breaking station. This is especially important in railroad operations since train orders and other messages frequently must be repeated word-for-word by the receiving party and transmitted back to the sending party so that the exact content of the message may thereby be checked. It may be appreciated, therefore, that an efficient break-in system enables the receiving party to obtain clarification of any parts of the message during transmission thereof which are not clear.

Other objects will become apparent as the detailed description proceeds.

Figure 2:
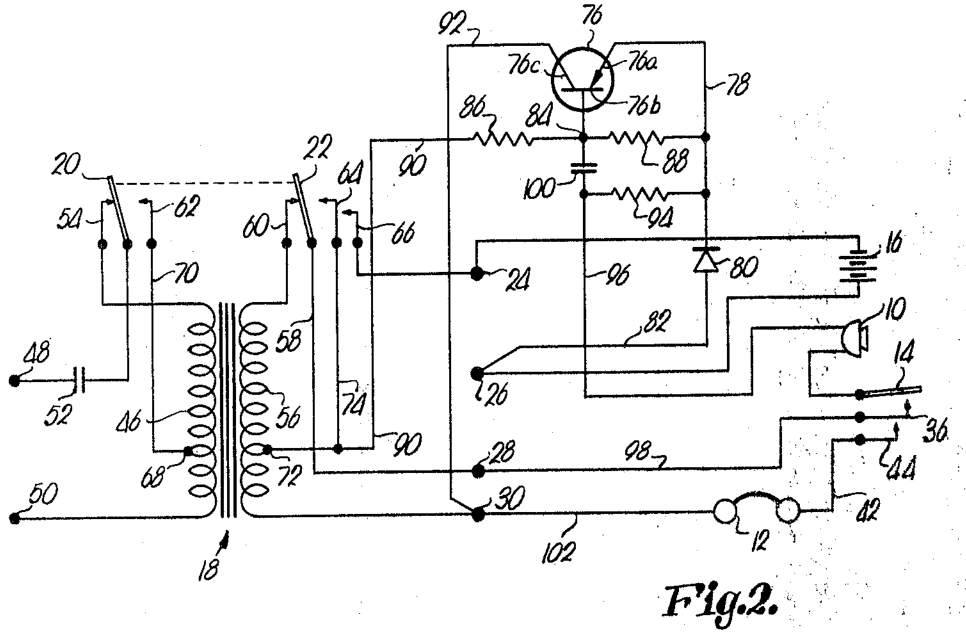

In the drawing:

FIGURE 1 is a schematic diagram of a typical existing railroad way station subset; and FIG. 2 is a schematic diagram showing the subset of FIG. 1 modified to include the apparatus of the present invention.

Referring to FIG. 1, it may be seen that a typical subset comprises a carbon microphone 10, a transducer in the form of a headset 12, a hang-up switch 14, a battery 16, a transformer 18, and a pair of ganged, single-pole double-throw switches 20 and 22. Terminals 24, 26, 28 and 30 are provided to facilitate the connection of the microphone, headset, hang-up switch and battery to the transformer 18.

Battery 16 is connected across terminals 24 and 26. Microphone 10 is connected across terminals 26 and 30 through the following circuit: along lead 32 to microphone 10, along lead 34 to switch 14, and then through contact 36 and along lead 38 to terminal 30 when switch 14 is closed. Switch 14 is shown in the normally open position, closure of the switch being effected by removing microphone 10 or headset 14 therefrom as is customary in older telephone instruments.

Headset 12, which is commonly a single earphone provided with coils having a 500 ohm impedance and a diaphragm responsive to audio frequency signals in the coils, is connected across terminals 28 and 30 by the following circuit: from terminal 28 along lead 40 to headset 12, along lead 42 to contact 44, and from contact 36 along lead 38 to terminal 30. Switch 14, when closed, electrically engages both contacts 36 and 44.

The ganged switches 20 and 22 are shown in the "listen" position. In this position, all the turns of winding 46 of transformer 18 are connected across the telephone line, the conductor pair of the line being connected to terminals 48 and 50. This circuit may be traced from terminal 48 through blocking capacitor 52 (employed to isolate transformer 18 from the direct voltage on the telephone line) to switch 20, and hence from contact 54 through winding 46 to terminal 50. Winding 56 of transformer 18 is connected across terminals 28 and 30 by a circuit from terminal 28 along lead 58 to switch 22, and hence from contact 60 through winding 56 to terminal 30.

From the foregoing it may be seen that when the apparatus of FIG. 1 is receiving incoming signals from the telephone line, such signals are impressed across all the turns of winding 46. Winding 46 has a value of approximately 20,000 ohms. Winding 56, however, is approximately a 500 ohm winding and is connected across terminals 28 and 30. The headset 12 is also connected across terminals 28 and 30, while microphone 10 and battery 16 are disconnected from the circuit. Thus, the operator may receive the incoming signals.

When it is desired to transmit, switches 20 and 22 are moved to the "transmit" position and engage contacts 62 and 64, 66 respectively. In this position the telephone line is connected across only a portion of winding 46 since switch 20 now engages contact 62 which, in turn, is connected to tap 68 on winding 46 by lead 70. Similarly, switch 22 engages both contacts 64 and 66 to connect terminal 24 to tap 72 on winding 56 by a circuit through contacts 64 and 66 and along conductor 74. In this manner, the battery 16 and the microphone 10 are connected in series across terminals 24 and 30.

During transmitting, only a 600 ohm portion of winding 46 is utilized in order to match the output of the transmitter with the impedance of the telephone line. The transmitter, by being connected to tap 72 on winding 56, looks into an impedance of approximately 50 ohms. Therefore, transformer 18 serves as a step-up transformer during transmitting. It should be noted, however, that for break-in operation, headset 12 is now connected across only the 50 ohm portion of winding 56 and, therefore, suffers a loss in signal level when receiving the breaking signal as compared with the signal level that would be obtained across the entire 500 ohm impedance of winding 56 in the "receive" position.

Referring to FIG. 2, the subset incorporating the apparatus of the present invention is shown. The circuitry from the telephone line receiving terminals 48 and 50 to the terminals 24, 26, 28 and 30 is identical to that shown in FIG. 1 except for one change which will be noted hereinafter. Furthermore, microphone 10, battery 16, hang-up switch 14 with its associated contacts 36 and 44, and headset 12 are components of the subset of FIG. 1.

FIG. 2 shows a PNP transistor 76 having an emitter element 76*a*, a base element 76*b*, and a collector element 76*c*. Transistor 76 is operated in common emitter configuration, the emitter 76*a* being connected by lead 78 to the cathode of diode 80, the anode of diode 80 being connected by lead 82 to terminal 26. Battery 16 is connected across terminals 24 and 26 as in FIG. 1, the positive output terminal of battery 16 being connected to terminal 26 while the negative output terminal of the battery is connected to terminal 24.

The base 76*b* forms the input to the transistor and is connected to junction point 84. Junction point 84 interconnects resistors 86 and 88 in series, such resistors forming a voltage divider for supplying the proper bias voltage to base 76*b*. The voltage divider circuit is completed by lead 90 from resistor 86 to an interconnection with lead 74; and lead 78 from resistor 88 to diode 80, and then along lead 82 to terminal 26 and the positive side of the battery 16. When switch 22 is in the transmit position, contacts 64 and 66 are electrically connected, thus interconnecting lead 74 with terminal 24 and the negative side of battery 16.

The collector circuit may be traced along conductor 92 to terminal 30, and hence to the tap 72 of winding 56 along lead 74 to contact 64, and from contact 66 to terminal 24 and battery 16 when switch 22 is in the transmit position. When switches 20 and 22 are in the receive position as shown, the transistor and its associated circuitry is disconnected from the apparatus.

The carbon microphone 10 is connected with the input of the transistor amplifier stage by the following circuit: from the positive side of battery 16 to terminal 26, along lead 82 to the anode of diode 80, from the cathode of diode 80 along conductor 78 to a resistor 94, from resistor 94 along lead 96 to microphone 10, from the microphone to switch 14 and contact 36 upon closure of the switch, along lead 98 to terminal 28, along lead 58 to switch 22, from contact 66 to terminal 24 when switch 22 is closed, and hence to the negative output terminal of battery 16. Resistor 94 serves as a load for the carbon microphone 10 and a blocking capacitor 100, interconnecting lead 96 with junction point 84, serves to isolate the D.C. power circuit of the microphone from the input of the transistor.

It should be noted that when switch 14 is closed during operation of the apparatus, the headset 12 is also in the circuit to facilitate break-in operation when switch 22 is in the transmit position due to the following circuit: from tap 72 on winding 56, along conductor 74 to contact 64, through switch 22 along lead 58 to terminal 28, along lead 98 to contact 36, from contact 44 along lead 42 to headset 12, and along lead 102 to terminal 30 and the lower end of winding 56. Therefore, the headset is placed across the 50 ohm portion of winding 56 while the apparatus is transmitting to permit break-in operation in a fashion to be described hereinafter.

To transmit over the telephone line, switches 20 and 22 are moved to the right-hand position as in FIG. 1, and the microphone or headset is removed from the hang-up switch 14 to thereby electrically connect switch 14 with contacts 36 and 44. The operator then speaks into microphone 10 and the audio frequency output therefrom passes through blocking capacitor 100 and is impressed across the emitter-base junction of transistor 76. The transistor effects amplification of the input signal from the microphone and delivers an output signal across the lower end or 50 ohm portion of winding 56. In this manner, the signal level on the telephone line is increased over the level produced by the apparatus of FIG. 1. Utilizing the 4½ volt battery normally employed with existing subsets, a type 2N217 or 2N651, or equivalent, transistor produces a 20 db gain on the line. Therefore, the loss usually experienced with way station subsets is fully compensated for and virtually eliminated.

An important aspect of the present invention is the provision of amplified break-in. As discussed previously, the transmitting apparatus is coupled with only the 50 ohm portion of winding 56 during transmission and, therefore, headset 12 is improperly matched with winding 56. In the present invention, however, a breaking signal induces a voltage change in winding 56 which, in turn, varies the voltage applied to collector 76*c*. As the collector voltage varies with the presence of a breaking signal, the current in the collector circuit will also be caused to change by the action of the transistor.

It may be seen from the circuitry that the electrical input to the headset shown as leads 42 and 102 form a part of a series circuit including battery 16 and the emitter-collector circuit of transistor 76. Thus, current flow or changes in the magnitude of the current flowing in the collector circuit of the transistor due to the breaking signal voltage on winding 56 necessarily causes a corresponding variance in the headset 12. In this manner, the nonlinear characteristics of the transistor are utilized to amplify the breaking signal by providing a greater current through the headset than would otherwise be present.

It may be appreciated that the connection of the transistor circuitry with the subset is readily accomplished through utilization of the terminals 24, 26, 28 and 30 on the subset instrument. Therefore, modification of existing subsets is extremely simple and, with appropriate color coding of leads to match their respective terminals, may be accomplished by relatively unskilled personnel. Furthermore, diode 80 is included in the circuit so that the transistor will not be harmed should the apparatus be inadvertently connected were the battery polarities reversed.

Besides raising the audio level on the line to an average of zero db, the invention also accentuates the higher audio tones which were previously lost because the transmitting unit required relatively high currents through winding 56. The present invention reduces battery drain to one-fourth of the value required for the unmodified subset. Thus, the audio level is increased and the higher, more readily readable tones are transmitted on the line, while battery life is extended to nearly shelf-life.

Having thus described the invention, what is claimed as new and desired to be secured by Letters Patent is:

Telephone apparatus for transmitting and receiving voice communications over a telephone line comprising:

direct current power source means;

a transformer having a high impedance winding adapted for coupling with said line and a low impedance winding in inductively coupled relationship to said high impedance winding;

a transistor having an emitter element, a base element, and a collector element;

first circuit means operably coupling said source means with said transistor for creating an output at one of said elements and an input at another of the elements, the remaining element being common to both the input and the output;

second circuit means connecting said output to one end of said low impedance winding;

a microphone;

third circuit means operably coupling said microphone with said input;

an electrical connection point on said low impedance winding between the ends thereof;

a transducer having an electrical input and an internal impedance substantially equal to the impedance of said low impedance winding;

dual section switching means having a receive position and a transmit position;

fourth circuit means connecting said transducer with one section of said switching means for connecting the transducer in parallel with said low impedance winding through said switching means when the latter is in said receive position;

fifth circuit means interconnecting said one section of the switching means and said connection point for connecting the transducer in parallel with the portion of said low impedance winding between the connection point and one end thereof when said one section of the switching means is in said transmit position, and for simultaneously operably coupling said transistor with said connection point;

an electrical connection point on said high impedance winding between the ends thereof presenting an electrical impedance between the last-mentioned point and one of the last-mentioned ends substantially equal to the impedance of said telephone line; and sixth circuit means connecting said point on the high impedance winding and the other end thereof with the other section of said switching means for coupling the last-mentioned point with said line when the switching means is in said transmit position, and for placing said high impedance winding in its entirety across said line when said switching means is in said receive position.

References Cited by the Examiner

UNITED STATES PATENTS

| | | | |
|---|---|---|---|
| 2,842,623 | 7/1958 | Lehr | 179—81 |
| 2,912,502 | 11/1959 | Talcott | 179—81 |
| 2,950,351 | 8/1960 | Leman | 179—81 |
| 2,976,369 | 3/1961 | Salzer | 179—81 |

ROBERT H. ROSE, *Primary Examiner.*

H. BOOHER, *Examiner.*

H. ZEELER, *Assistant Examiner.*